United States Patent
Roch

(10) Patent No.: US 9,565,167 B2
(45) Date of Patent: Feb. 7, 2017

(54) LOAD BALANCING INTERNET PROTOCOL SECURITY TUNNELS

(71) Applicant: Evelyne Roch, Gatineau (CA)

(72) Inventor: Evelyne Roch, Gatineau (CA)

(73) Assignee: Huawei Technologies Co., Ltd., Shenzhen (CN)

(*) Notice: Subject to any disclaimer, the term of this patent is extended or adjusted under 35 U.S.C. 154(b) by 6 days.

(21) Appl. No.: 14/601,995

(22) Filed: Jan. 21, 2015

(65) Prior Publication Data

US 2016/0212098 A1 Jul. 21, 2016

(51) Int. Cl.
- *G06F 12/14* (2006.01)
- *H04L 29/06* (2006.01)
- *H04L 12/803* (2013.01)
- *H04L 29/12* (2006.01)

(52) U.S. Cl.
CPC .......... *H04L 63/029* (2013.01); *H04L 47/125* (2013.01); *H04L 61/10* (2013.01); *H04L 61/25* (2013.01); *H04L 63/00* (2013.01)

(58) Field of Classification Search
CPC ........ H04L 63/029; H04L 63/00; H04L 61/10; H04L 61/28; H04L 29/08144; H04L 29/08306; H04L 29/08288; H04L 29/12047

See application file for complete search history.

(56) References Cited

U.S. PATENT DOCUMENTS

| | | | | |
|---|---|---|---|---|
| 8,036,182 B2* | 10/2011 | Takeda | ..................... | H04W 8/10 370/338 |
| 8,332,514 B2* | 12/2012 | Qiu | ....................... | H04L 47/125 709/226 |
| 8,819,275 B2* | 8/2014 | Liu | ..................... | H04L 67/1027 370/328 |
| 8,819,280 B1* | 8/2014 | Liu | ..................... | G06Q 20/401 709/226 |
| 2003/0093560 A1* | 5/2003 | Ono | ..................... | H04L 67/1008 709/244 |

(Continued)

FOREIGN PATENT DOCUMENTS

| CN | 1416064 A | 5/2003 |
|---|---|---|
| CN | 1642109 A | 7/2005 |
| CN | 103067290 A | 4/2013 |

OTHER PUBLICATIONS

International Search Report and Written Opinion for International Patent Appl. No. PCT/CN2015/096833 dated Mar. 8, 2016.

(Continued)

*Primary Examiner* — Krisna Lim
(74) *Attorney, Agent, or Firm* — Gowling WLG (Canada) LLP

(57) ABSTRACT

A load balancer is provided that can direct Internet Protocol Security (IPsec) traffic received from a single IPsec tunnel initiator to one of a plurality of endpoints provided Virtual Private Network (VPN) gateways in a network. The load balancer uses IP (Internet Protocol) addresses and SPIs (Security Parameter Identifier) to identify an endpoint responsible for processing particular packets for the VPN. Messages received at the load balancer from the endpoints are utilized to map endpoints responsible for processing packets having a particular IP address and SPI for forwarding IPsec traffic to the correct endpoint.

26 Claims, 10 Drawing Sheets

(56) References Cited

U.S. PATENT DOCUMENTS

2010/0268935 A1* 10/2010 Rodgers ............... H04L 63/164
　　　　　　　　　　　　　　　　　　　　　　　　713/153
2010/0306572 A1* 12/2010 Salvarani ............. H04L 63/164
　　　　　　　　　　　　　　　　　　　　　　　　714/4.1

OTHER PUBLICATIONS

Abstract of U.S. Publication No. 2003093560 corresponding to CN1416064A.
English translation of Abstract of CN application No. 1642109.
English translation of Abstract of CN application No. 103067290A.
S. Kent, IP Authentication Header, IETF RFC4302, Dec. 2005.
S. Kent, IP Encapsulating Security Payload (ESP), IETF RFC 4303, Dec. 2005.
V. Devarapalli & K. Weniger, Redirect Mechanism for the Internet Key Exchange Protocol Version 2 (IKEv2), IEFT RFC5685, Nov. 2009.
C. Kaufman, P. Hoffman, Y. Nir, P. Eronen, Internet Key Exchange Protocol Version 2 (IKEv2), IEFT RFC5996, Sep. 2010.

* cited by examiner

LOAD BALANCING INTERNET PROTOCOL SECURITY TUNNELS

TECHNICAL FIELD

The current disclosure relates to load balancing network traffic and in particular to load balancing Internet Protocol Security (IPsec) traffic.

BACKGROUND

In corporate, enterprise and data center networking environments servers or processing devices may replicate processing functions across multiple servers or processing devices in order to provide greater processing capabilities. Although the identical functionality may be replicated across multiple servers or processing devices, each device is associated with its own address and as such, requests for the functionality must be sent to a specific one of the multiple servers or computing devices.

As processing requirements increase, a load balancer may be placed in front of the plurality of servers or computing devices to distribute traffic between the servers. The load balancer receives data from a connecting client, selects an appropriate server and forwards the data to the selected server.

The functionality provided by the servers may include Internet Protocol Security (IPsec) services. IPsec tunnels may be established between an initiating computing device and one of the servers either as a destination end point or as a transit point. However, the same server must process all of the traffic associated with an individual IPsec tunnel in order to maintain an IPsec tunnel. IPsec tunnels therefore present challenges enabling load balancing of network traffic.

Therefore there is a need for improved load balancing of IPsec traffic in a network.

SUMMARY

In accordance with an aspect of the present disclosure there is provided a method for load balancing comprising: receiving an Internet Protocol Security (IPsec) packet at a load balancer from an IPsec initiator, the received packet comprising an IP address of the IPsec initiator and a security parameter identifier (SPI); forwarding the received packet to each of a plurality of IPsec endpoints when the IP address of the IPsec initiator and the SPI of the received packet is unrecognized by the load balancer; receiving a response message from one of the plurality of IPsec endpoints in response to the forwarded packet; and determining an IPsec endpoint associated with the IP address and the SPI of the received packet based on the received response message.

In accordance with another aspect of the present disclosure there is provided a load balancer apparatus comprising: a network interface coupled to a network, the network interface for receiving a Internet Protocol Security (IPsec) packet from an IPsec initiator, the received packet comprising an IP address of the IPsec initiator and a security parameter identifier (SPI); a processor coupled to the network interface, for executing instructions that configure the load balancer apparatus to: forward the received packet to each of a plurality of IPsec endpoints connected to the network interface when the IP address of the IPsec initiator and SPI of the received packet is unrecognized by the load balancer; receive a response message from one of the plurality of IPsec endpoints in response to the forwarded packet; and update IPsec endpoints associated with the IP address and the SPI of the received packet based on the received response message.

In accordance with yet another aspect of the present disclosure there is provided a virtual private network (VPN) endpoint apparatus comprising: a network interface coupled to a network, the network interface for receiving a Internet Protocol Security (IPsec) packet from an IPsec load balancer, the received packet comprising an IP address of the IPsec initiator and a security parameter identifier (SPI); and a processor coupled to the network interface, for executing instructions that configure the endpoint apparatus to: determine if the SPI of the received IPsec packet is associated with an IPsec tunnel terminated by the endpoint apparatus; and send an informational message to the IPsec load balancer indicating that the received IPsec packet is not terminated by the endpoint apparatus.

In accordance with still yet another aspect of the present disclosure there is provided a method for use in load balancing comprising: receiving at an Internet Protocol Security (IPsec) endpoint apparatus an IPsec packet from an IPsec load balancer, the received packet comprising an IP address of the IPsec initiator and a security parameter identifier (SPI); determining if the SPI of the received IPsec packet is associated with an IPsec tunnel terminated by the endpoint apparatus; and sending an informational message to the IPsec load balancer indicating that the received IPsec packet is not terminated by the endpoint apparatus.

In accordance with yet another aspect of the present disclosure there is provided a non-transitory computer readable medium having instructions for execution by a processor, which when executed configure a computing device to: receiving an IPsec packet at a load balancer from an IPsec initiator, the received packet comprising an IP address of the IPsec initiator and a security parameter identifier (SPI); forwarding the received packet to each of a plurality of IPsec endpoints when the IP address of the IPsec initiator and the SPI of the received packet is unrecognized by the load balancer; receiving a response message from one of the plurality of IPsec endpoints in response to the forwarded packet; and updating IPsec endpoints associated with the IP address and the SPI of the received packet based on the received response message.

In accordance with yet another aspect of the present disclosure there is provided a non-transitory computer readable medium having instructions for execution by a processor, which when executed configure a computing device to: receiving at an Internet Protocol Security (IPsec) endpoint apparatus IPsec packets from an IPsec load balancer, the received packet comprising an IP address of the IPsec initiator and a security parameter identifier (SPI); determining if the SPI of the received IPsec packet is associated with an IPsec tunnel terminated by the endpoint apparatus; and sending an informational message to the IPsec load balancer indicating that the received IPsec packet is not terminated by the endpoint apparatus.

BRIEF DESCRIPTION OF THE DRAWINGS

Embodiments are described herein with reference to the appended drawings, in which.

DETAILED DESCRIPTION

Load balancing data traffic may provide more efficient use of resources. As described further below, a load balancer may be provided that can direct IPsec traffic of individual tunnels to different tunnel end points, even if the IPsec tunnel traffic is received from the same source IP address.

A load balancer is provided that can direct virtual private networking (VPN) IPsec traffic (Internet Protocol Security) received from a single IPsec tunnel initiator to one of a plurality of endpoints provided by VPN gateways in a network. The load balancer provides distribution of VPN traffic such originating VPN traffic can be distributed amongst endpoints. However in distributing VPN traffic, once a session is initiated, the load balancer may not be able to determine which endpoint subsequent traffic should be directed to. The load balancer uses IP (Internet Protocol) addresses and SPIs (Security Parameter Identifier) to identify an endpoint responsible for processing particular packets for the VPN. When a message is received at the load balancer for a known source IP address and an unknown SPI value, the load balancer is therefore unable to identify which endpoint the packet is associated with. The load balancer forwards the received packet to all of the endpoints and if an endpoint receives a packet with an SPI for a tunnel it does not terminate, the endpoint responds with a message indicating that the SPI is unknown. From the responses the load balancer can determine the appropriate endpoint for the SPI. A table may be utilized by the load balancer to track responses and identify the appropriate endpoint.

Figure 1:
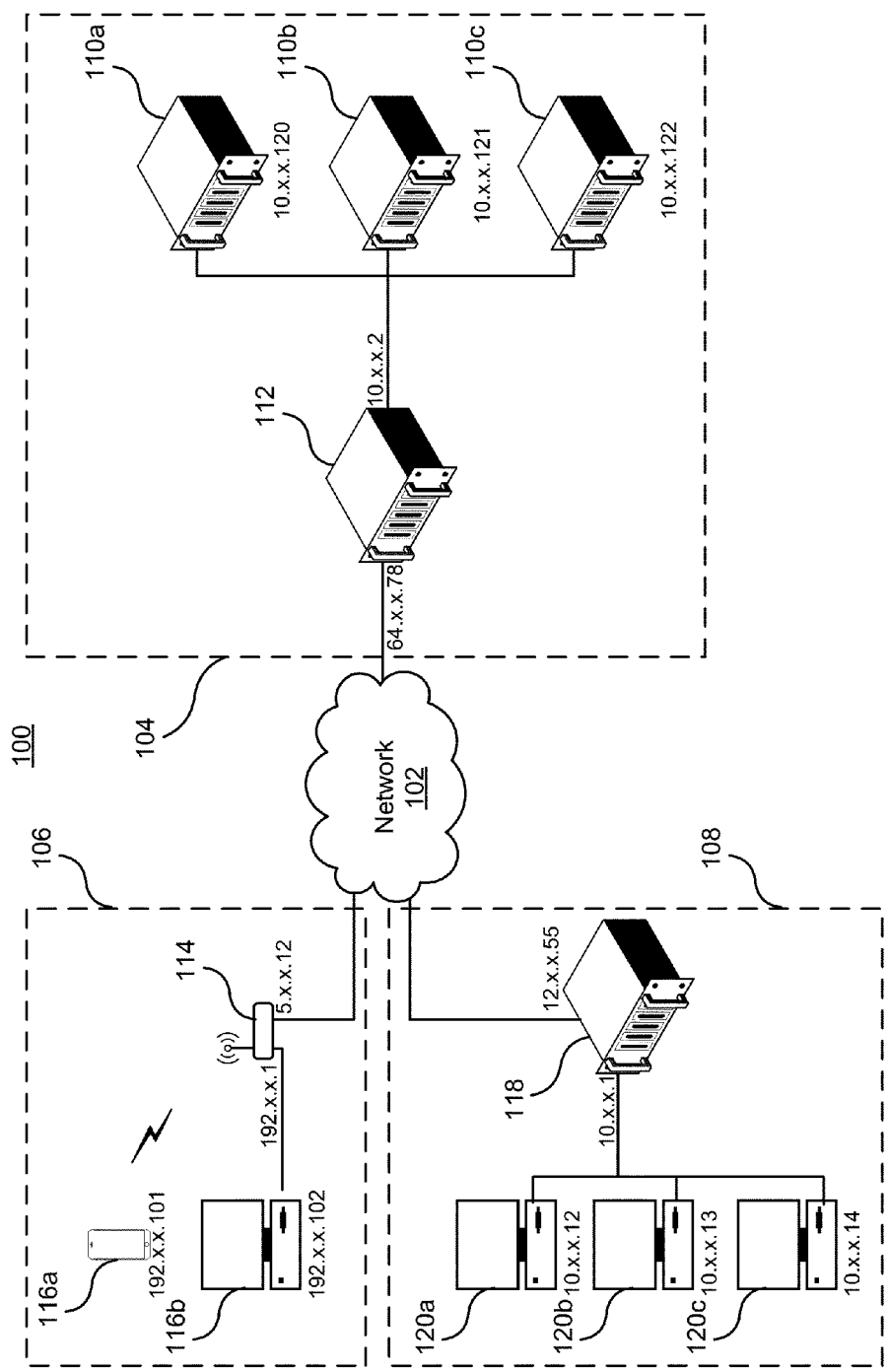
FIG. 1 depicts an environment in which load balancing of IPsec tunnels may be used.

FIG. 1 depicts an environment in which load balancing of IPsec tunnels may be used. The environment 100 comprises a number of computing devices communicatively coupled to a network 102. The network 102 provides communication between connected computing devices. The devices may include a number of computing devices located at different locations. The devices may be external to or part of one or more networks. As an example, the computing devices may include computing devices located at a corporation's headquarters or main campus 104, computing devices located at a home location 106 and computing devices located at a branch office 108 of the corporation. It will be apparent that these illustrative examples are not the sole possibilities. Numerous different use-cases exist that share a similar architecture, although the particular uses differ.

The computing devices may for example be located at the corporate headquarters 104 and may include a number of virtual private network (VPN) gateways 110a, 110b, 110c (referred to collectively as VPN gateways 110) that provide functionality to connected devices. As described further, the VPN gateways 110 provide a VPN termination or VPN endpoint that provides a secure communication tunnel between computing devices such as for example in the corporation's headquarters 104 and computing devices located at remote locations such as at home 106 and at branch offices 108. Each of the VPN gateways 110 provides substantially similar VPN functionality, and as such, a computing device may connect to any of the VPN gateway 110 in the same manner. Processing functions or services may be duplicated across multiple VPN gateways 110 in order to provide redundancy as well as expanded processing capabilities. In order to balance the processing load between the VPN gateways 110 and allow devices to connect to the different VPN gateways 110 transparently, a load balancing functionality 112 may be provided that receives requests and data for the VPN gateways 110 and directs the request to one of the VPN gateways 110.

The computing devices at the home location 106 may include an access device or gateway 114 that provides access to the network 102 to connected computing devices 116a, 116b (referred to collectively as computing devices 116). As depicted, the access device 114 may be a router. The computing devices 116 may be connected to the access device 114 wirelessly or by a wired connection. The computing devices 116 access the network 102 through the access device 114. As depicted, the access device 114 can be associated with a public IP address, depicted as 5.x.x.12 as well as a private network address, depicted for example as 192.x.x.1, of the internal network. The computing devices 116 are associated with IP addresses for the internal network, namely 192.x.x.101 and 192.x.x.102 respectively. When accessing a device or service over the internet, the access device 114 modifies traffic from the devices 116 so that it appears to be originating from the public IP address of the access device 114.

Similarly, the computing devices located at the branch office 108 may include an access device or gateway 118 that provides similar functionality to the access device 114 in the home location 106. A number of computing devices, depicted as desktop computers 120a, 120b, 120c (referred to collectively as computing devices 120), are connected to the access device 118. It will be appreciated that the access device 118 may provide additional functionality, or may have additional capacity in order to provide the required quality of service in an office environment compared to the home location 106. However, the functionality of the access device 118 is similar to that of the access device 114 in the home location in that the access device 118 provides access to the internet for the computing devices 120 connected to the internal network. As depicted, the access device 118 includes at least one public IP address, depicted as 12.x.x.55 as well as at least one IP address on the internal network, depicted as 10.x.x.1. Each of the computing devices 120 connected to the access device 118 is associated with a respective IP address on the internal network, depicted as 10.x.x.12, 10.x.x.13, 10.x.x.14 respectively. The access device 118 provides internet access to the computing devices 120. When accessing computing devices or services over the internet, the access device 118 may encapsulate traffic from the computing devices 120 into a tunnel so that it appears to be originating from the public IP address of the access device 118.

The access devices 114, 118 may be IPsec enabled devices capable of establishing a secured tunnel to a VPN gateway, such as one of the VPN gateways 110. As will be appreciated the IPsec tunnel may be used to authenticate and/or encrypt data transmitted between the tunnel end points. Once a tunnel is established to a particular one of the VPN gateways, all associated traffic for the tunnel connection must be sent to the same VPN gateway. Accordingly, the load balancing functionality 112 must send all associated traffic to the same VPN gateway 110 for the VPN. The load balancing functionality 112 may identify associated traffic for a particular tunnel using the IP address the traffic originated from. However, all traffic from a particular access device 114, 118 appear to the load balancing functionality 112 to have originated from the same IP address and as such are sent to the same VPN gateway 110. That is, even though the traffic originating from device 116a could be processed by VPN gateway 110a and the traffic originating from device 116b could be processed by VPN gateway 110b, the originating IP address will appear to be the same to the load balancing functionality, and as such both traffic flows would be sent to the same VPN gateway by the load balancing functionality 112, if only the source IP address is used by the load balancer to identify the individual tunnel traffic.

As described further, it is possible for the load balancing functionality 112 to utilize additional information than the originating source IP address in determining where received traffic should be processed. The load balancing functionality 112 may be configured to use both the IP address and other information, such as a security parameter identifier (SPI) in directing traffic to respective VPN gateways. Utilizing the additional information allows the load balancing functionality 112 to direct traffic from different computing devices to different VPN gateways, even if the traffic is received from the same access device.

Figure 2:
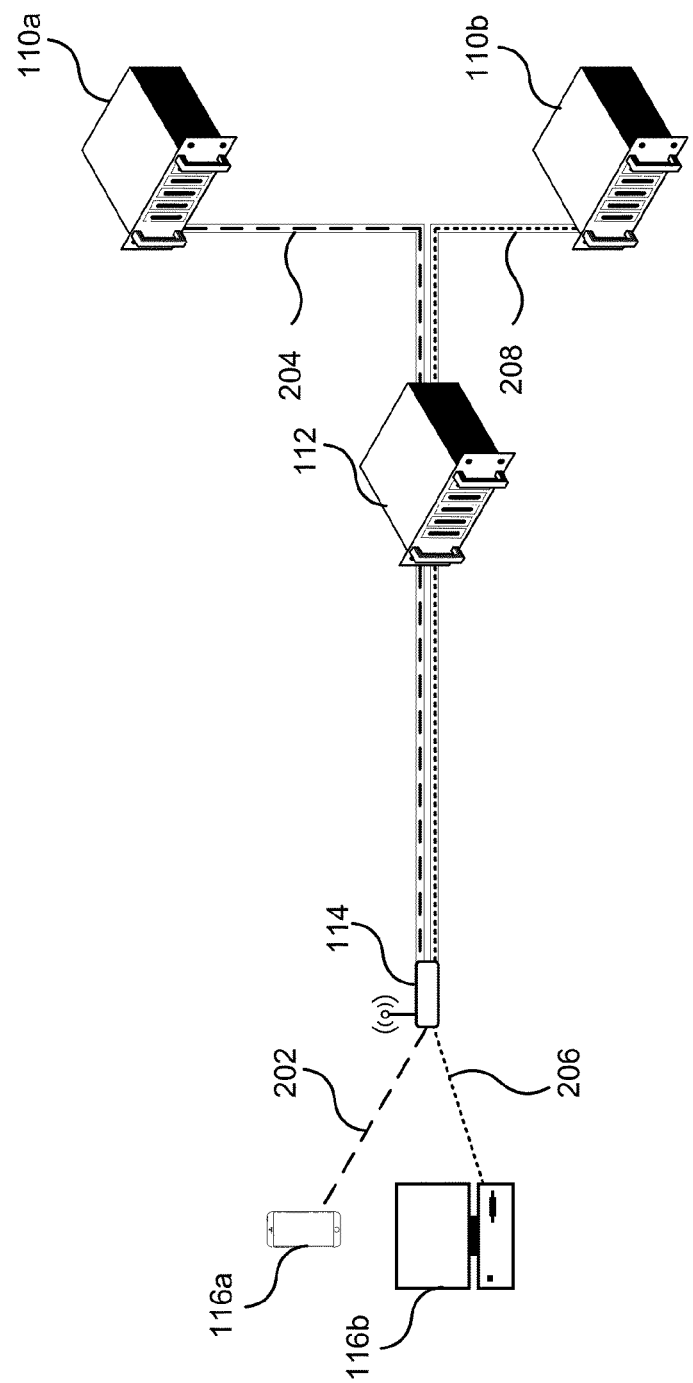
FIG. 2 depicts load balancing IPsec traffic originating from the same access device.

FIG. 2 depicts load balancing IPsec traffic originating from the same access device. As depicted, the access device 114 is an IPsec initiator that establishes an IPsec tunnel with a VPN gateway 110. However, the access device 114 attempts to establish the IPsec tunnel with the load balancing functionality 112. That is, tunnel initiation requests and subsequent traffic are directed to the load balancing functionality 112, which directs the traffic to the appropriate VPN gateway 110, for example, by modifying header information of the received traffic. The load balancing functionality 112 selects an appropriate one of the VPN gateways 110 to direct the traffic to. As depicted, the communication device 116a may communicate with the access device 114. The communication 202 between the access device 114 and the computing device 116a may not be secured. The access device 114 may establish a secure tunnel 204 with the VPN gateway 110a. Although the communication passes through the load balancing functionality 112, the IPsec tunnel is established between the access device 114 and the selected VPN gateway 110a. As depicted, the load balancing functionality 112 is able to correctly direct traffic to different VPN gateways even if the traffic originates from the same access device 114. Accordingly, it is possible for the load balancing functionality 112 to utilize a different VPN gateway for traffic of different tunnels. For example, communications 206 from the computing device 116b may travel over an IPsec tunnel 208 between the access device and the VPN gateway 110b selected by the load balancing functionality 112.

The network environment described above is intended to provide an illustrative example for the clarity of the description. Although specific computing devices and connections are described above, it will be appreciated that numerous other actual implementations are possible. Accordingly, the following description refers to IPsec initiators, which are any computing device capable of initiating multiple IPsec tunnels. The IPsec initiators may include access points, gateways, routers, computers, servers or other IPsec capable computing devices. Although the IPsec initiators are described as establishing different IPsec tunnels on behalf of different computing devices, it is contemplated that a single computing device may initiate multiple separate IPsec tunnels. Similarly, the following description refers to IPsec endpoints, which may be any computing device capable of terminating an IPsec tunnel which may be incorporated in access points, gateways, routers, computers, servers or other computing devices.

Figure 3:
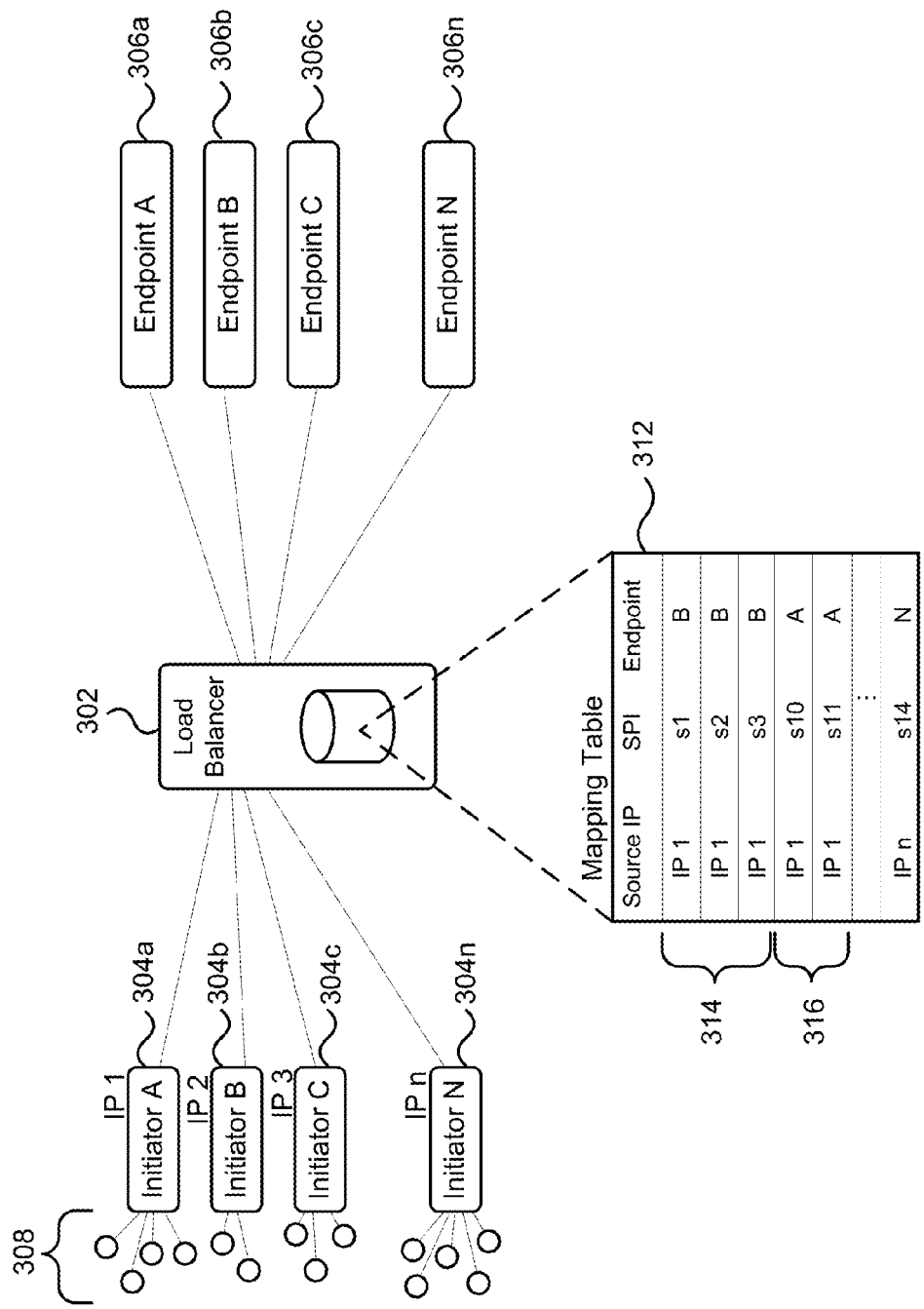
FIG. 3 depicts components of a system for load balancing IPsec tunnels.

FIG. 3 depicts components of a system for load balancing IPsec tunnels. As depicted, the system comprises a load balancer 302, a number of IPsec initiators 304a, 304b, 304c, 304n (referred to collectively as initiators 304), and a number of VPN gateways, referred to as IPsec endpoints 306a, 306b, 306c, 306n (referred to collectively as endpoints 306). The load balancer 302 receives tunnel initiation requests from the initiators 304, and for each initiation request, the load balancer 302 determines which of the endpoints 306 to direct the tunnel to for the VPN. The selection criteria used by the load balancer 302 may vary. For example, the load balancer may select endpoints in a round-robin fashion, or based on a processing load of one or more of the endpoints 306. Regardless of how the load balancer selects an endpoint 306 terminator, all subsequent traffic associated with the established tunnel must be sent by the load balancer to the same endpoint.

As depicted in FIG. 3, each of the initiators 304 may be associated with a respective IP address that is used for communication between the initiators 304 and the load balancer 302. Each initiator 304 may also be in communication with one or more communication end points 308, depicted as circles in FIG. 3. Each of the initiators 304 may establish an IPsec tunnel with one of the endpoints 306, selected by the load balancer, in order to protect traffic from one of the communication devices 308. In establishing and utilizing the tunnel, the initiator directs the tunnel traffic, including the initiation request, to the load balancer. The load balancer selects an appropriate VPN gateway for the endpoint and forwards the traffic on to it.

The load balancer 302 allows multiple IPsec tunnel initiators 304 to initiate IPsec tunnels towards a single IP address that is used to represent multiple IPsec tunnel endpoints 306. In order to ensure that all packets corresponding to the same tunnel reach the appropriate endpoint 306, the load balancer 302 maintains a mapping table 312 that provides information for identifying the endpoint for processing received packets. When an IPsec packet arrives, the mapping is used to determine the correct endpoint for processing the packet and the load balancer 302 forwards the packet to the determined endpoint. If the received IPsec packet is associated with establishing a new IPsec tunnel, that is the packet is not associated with an existing tunnel, the load balancer 302 may select the endpoint for forwarding the packet to, based on any appropriate load balancing criteria.

The mapping table 312 used by the load balancer 302 associates a source IP that a packet was received from, a security parameter identifier (SPI) of the packet as well as the endpoint that should be used for processing packets having the same source IP and SPI. As will be appreciated, packets associated with the same tunnel will have the same IP address, which will correspond to the IP address of the initiator. Further, packets associated with the same tunnel may have different SPI values. When a packet arrives with a known source IP address and an unknown SPI value, the load balancer 302 is unable to identify which endpoint the packet is associated with. Accordingly, the load balancer 302 includes a process to identify which of the endpoints is associated with the SPI. When a packet is received at the load balancer 302, after the initial IKE Phase 1 message that is used to make the load balancing decision, with an unknown SPI, that is an SPI that is not in the mapping table 312, the load balancer 302 forwards the received packet to all of the endpoints 306. If an endpoint 306 receives a packet with an SPI for a tunnel it does not terminate, the endpoint 306 responds with a message indicating that the SPI is unknown. If the endpoint 306 recognizes the SPI of the packet, the packet is processed as normal, and a response message is returned to the initiator through the load balancer 302. The load balancer 302 monitors the messages received from the gateways and uses the responses to update the mapping table 312.

The mapping table 312 in FIG. 3 depicts two different IPsec tunnels 314, 316 that were initiated at the same initiator, that is initiator 304a, but terminated by different endpoints 306b, 306a respectively. As depicted, the first IPsec tunnel 314 is associated with three different SPIs, namely s1, s2, s3. Accordingly, any packet that is received at the load balancer 302 from the source IP address 'IP 1' and having an SPI of s1, s2 or s3 will be forwarded to endpoint 306b for processing. However, other packets that are received from the same source IP address, namely 'IP 1', may be directed to other endpoints. For example, a second tunnel initiated from the source IP address 'IP 1' may be associated with two SPIs, namely s10 and s11. Any packet arriving at the load balancer from the source IP address 'IP 1' and having an SPI of s10 or s11 will be forwarded to endpoint 306a for further processing.

The traffic within an IPsec tunnel may be encrypted; however, the SPI is not encrypted and as such can be viewed by the load balancer 302. The SPI is used by the initiator and endpoint to uniquely identify a security association (SA) or child SA. Although the SPI may not be encrypted, responses from a terminator, such as responses indicating that an SPI was not recognized, may be sent within an encrypted SA. In order to allow the load balancer 302 to utilize the responses, the endpoints may additionally, or alternatively, send the responses outside of the SA. Accordingly messages from endpoints indicative of an unrecognized SPI may be received by the load balancer 302 and used in updating the mapping table 312.

Establishing an IPsec tunnel involves the exchange of various messages. An initial key exchange (IKE) process is carried out in order to establish an initial security association (SA) between the tunnel end points. An SA defines the security information, such as cryptographic algorithms used, shared keys etc, which are initially used in establishing a tunnel. Once an SA is established, one or more child SAs is established for communicating between tunnel endpoints. Each child SA is used for communicating in one direction and as such if bi-directional communication is required or desired, at least two child SAs will be established. For bi-directional traffic, child SAs are typically established in pairs within the same IKE exchange. Packets within an established tunnel may be, but do not need to be, encrypted. Packets may be Authenticated Header (AH) packets that provide protection against the content of the packet being changed in transit, however AH packets are not separately encrypted. Encapsulating Security Payload (ESP) packets may be used for encrypting, and possibly authenticating, packets.

As described above, the load balancer 302 receives packets and determines one of a plurality of IPsec endpoints 306 to forward the packets to. If the received packet is not associated with an existing IPsec tunnel, for example the packet is associated with a request for establishing the IPsec tunnel, the load balancer 302 can select one of the plurality of IPsec endpoints 306 according to a selection criteria. If the received packets are associated with an existing IPsec tunnel, for example the packet includes an SPI, the load balancer 302 attempts to determine a mapping between the packet, and in particular the source IP address and SPI of the packet, and the IPsec endpoint 306 responsible for the associated tunnel. The load balancer 302 may utilize a mapping table that associates a packet's source IP address and an SPI value with the IPsec endpoint responsible for processing the packets. If a match is found, the packet is forwarded to the associated VPN providing the IPsec endpoint 306.

When an IKE packet is received at an endpoint that is responsible for the tunnel associated with the SPI, the packet will be processed as normal. Depending upon the type of message, the endpoint may transmit an IKE message establishing a child SA, or other related message. The child SA message sent from an endpoint may be recognized by the load balancer 302 based on the header information, which may be un-encrypted. Accordingly, the load balancer 302 may receive the message, identify the child SPI and associate the new SPI with the endpoint that sent the message. Accordingly, when another packet having a matching source IP and SPI is received, the packet may be forwarded onto the endpoint.

When an IKE packet is received at the load balancer 302 that does not match a source IP and SPI pair in the mapping table but is not the first IKE Phase 1 message that is used to perform the load balancing decision, the load balancer 302 will be unable to determine the correct IPsec endpoint to forward the packet to for processing. Accordingly, the load balancer 302 will forward the packet to all IPsec endpoints 306 and monitor the responses from the endpoints 306 in order to determine the appropriate endpoint to forward subsequent packets to. The responses that the load balancer 302 monitors may include informational messages sent from the endpoints outside of any established SA indicating the SPI of the forwarded packet is not recognized by the endpoint. The informational messages allow the load balancer 302 to determine endpoints that subsequent packets should not be forwarded to. When a packet is processed by an endpoint that is associated with the tunnel for the packet, the response may be sent in an AH/ESP packet which may not be accessible to the load balancer 302, due to possible encryption. Accordingly, the load balancer 302 is not able to positively identify the endpoint responsible for processing the packet and instead may rely upon a process of elimination to determine the endpoint for processing the packet. When the load balancer 302 receives the informational messages indicative that the SPI is not recognized, the corresponding endpoint is eliminated from a list of possible endpoints that may process packets associated with the matching source IP and SPI.

Figure 4:
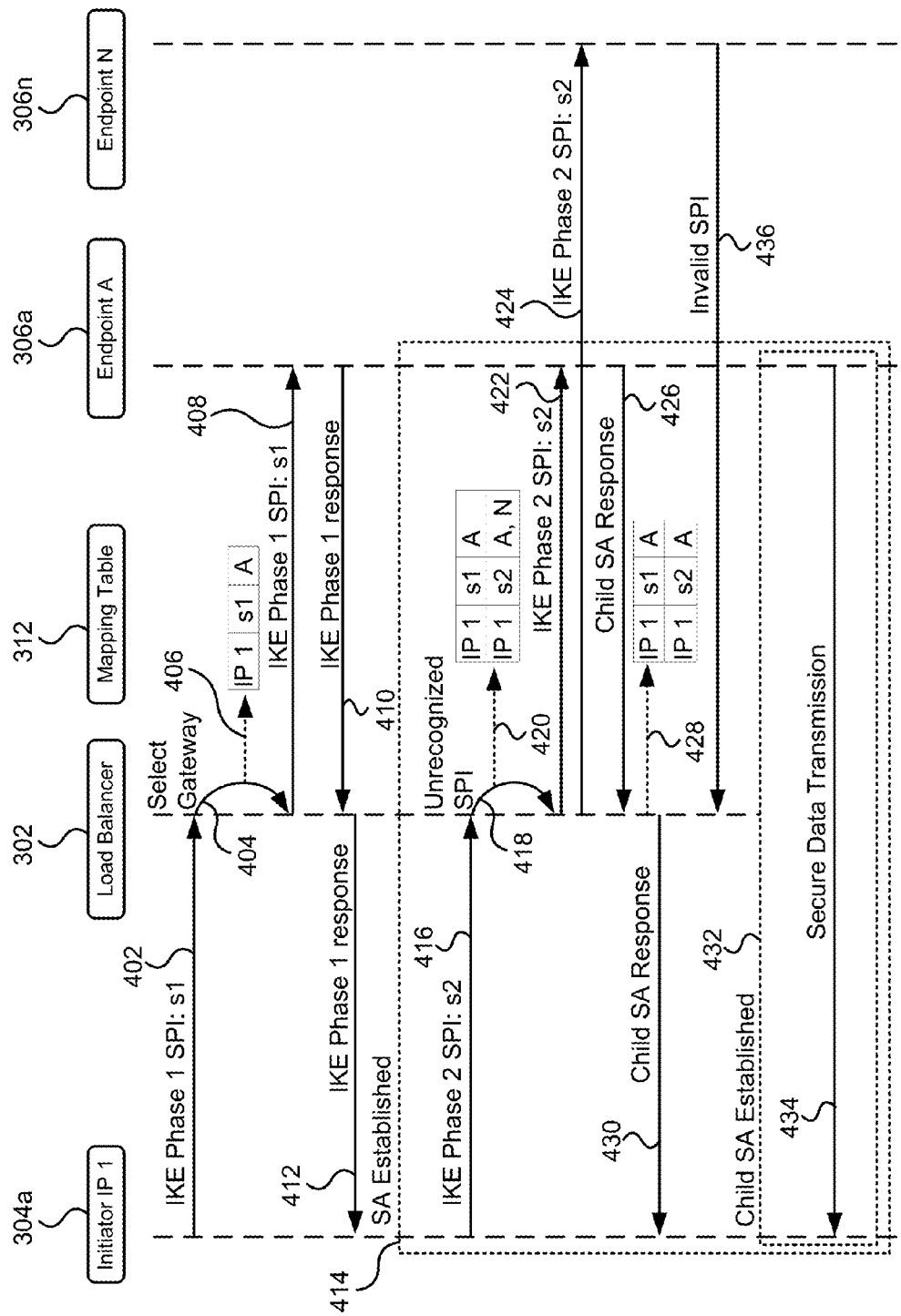
FIGS. 4, 5 and 6 depict process flows for load balancing IPsec tunnels.
Figure 5:
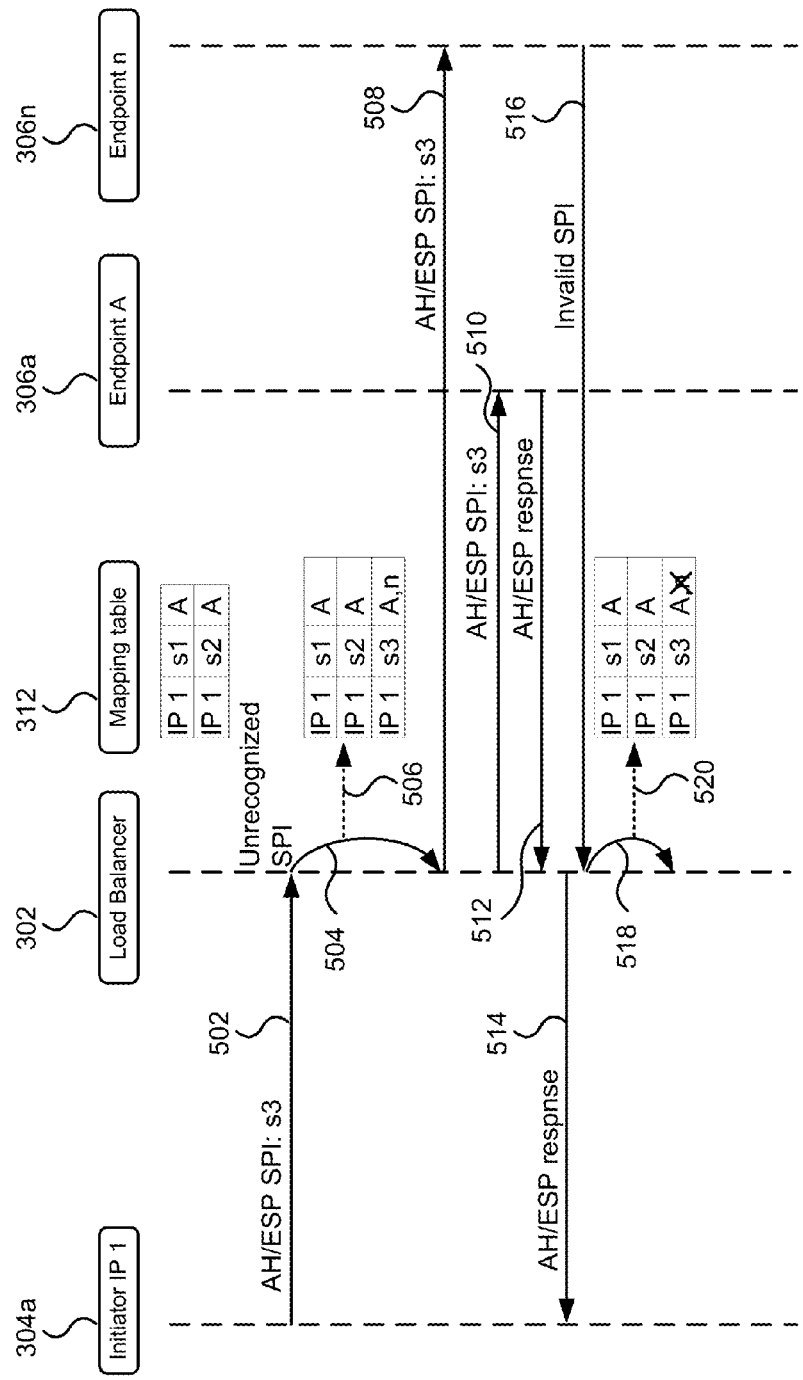
Figure 6:
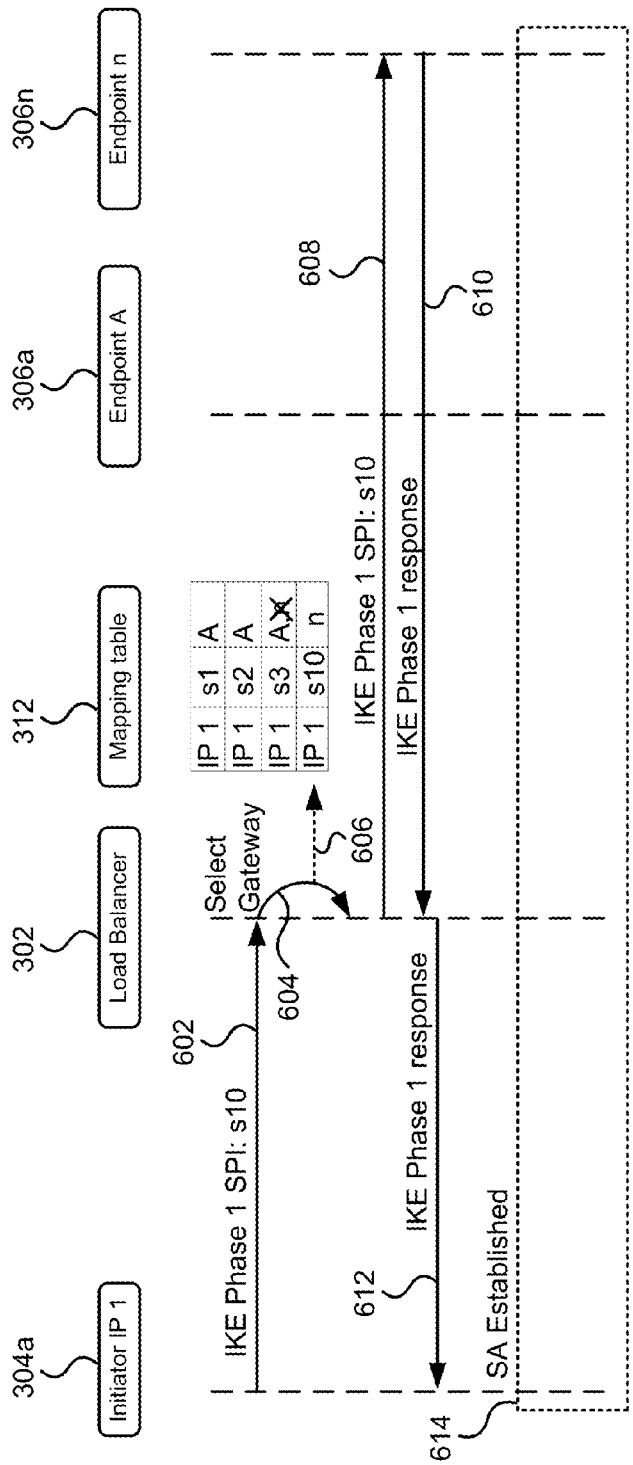

FIGS. 4, 5 and 6 depict process flows for load balancing IPsec tunnels. The process flows depicted in FIGS. 4, 5 and 6 are intended to convey the overall process for load balancing IPsec tunnels, and as such some details with regard to the particular messages transmitted are not covered in detail. However, the IPsec protocol as well as other protocols used within IPsec such as IKE, AH and ESP are well documented and understood.

An initiator 304 attempts to establish an IPsec tunnel with an IPsec endpoint by sending an initial IPsec, or more particularly an IKE, message 402 to the load balancer 302. The initial message includes an SPI that may be used for identifying a resultant SA. The load balancer 302 receives the initial request message for establishing an IPsec tunnel and selects 404 one of the possible IPsec endpoints for establishing the tunnel with. Once the endpoint is selected, which in FIG. 4 is depicted as endpoint 306a, the load balancer records the association of the source IP address, which as depicted in FIG. 4 is 'IP 1' associated with the initiator 304a, the SPI of the received message, namely 's1', and the selected endpoint. The association between source IP, SPI and endpoint may be stored 406 in the mapping table 312. Further, once the endpoint is selected by the gateway for processing of the tunnel request, the message is forwarded 408 to the selected endpoint 306a, although it may modify the destination address first. The endpoint 306a receives and processes the message and responds with an IKE phase 1 response message 410, which is received by the load balancer 302 and forwarded to the initiator 412.

Although described above as exchanging a single request and response, the IKE phase 1 exchange may involve the exchange of multiple messages in order to negotiate the security information, such as protocols and keys used. Once the IKE phase 1 exchange is completed an initial SA is established 414 between the initiator 304a and the selected endpoint 306a. Following IKE phase 1, the initiator may establish additional child SAs with an IKE phase 2 message exchange. The IKE phase 2 messages are sent within the established SA; however they include a new SPI for identifying the new child SA. As depicted, the initiator may send an IKE Phase 2 message 416 that includes the new SPI s2. When the load balancer 302 receives the phase 2 message, the load balancer compares the source IP and the SPI of the message to those in the mapping table 312. However, since the SPI s2 is not associated with the source IP in the mapping table, the SPI is unrecognized 418 to the load balancer 302 and as such the load balancer 302 is unable to determine a gateway to send the received message to. When a message is received with an unrecognized IP:SPI pair, that is an IP and SPI that are not in the mapping 312, the load balancer 302 records the IP:SPI in the mapping table in association with all of the endpoints 420 and forwards the packet to all IPsec endpoints associated with the load balancer 422, 424. Each of the endpoints 306a, 306n receives the forwarded message. In the case of the endpoint 306a, the endpoint is the endpoint responsible for processing the packets, and as such is able to correctly process the packets and responds with a child SA response 426. The load balancer 302 receives the child SA response from the endpoint associated with the tunnel. The load balancer is able to identify the child SA response 426 from the endpoint based on the header information of the message. Accordingly, when a child SA message is received from one of the endpoints 306, the load balancer is able to update 428 the mapping table appropriately in order to associate the endpoint 306a that responded with the child SA message with the IP:SPI in the mapping table 312. The child SA response received at the load balancer from the endpoint is forwarded 430 to the initiator 304a. The child SA response 430 is received at the initiator 304a and a child SA is established 432, which may be used for secure data transmission 434, whether authenticated and/or encrypted. There may be two child SAs established in the same message exchange for bi-directional traffic.

The endpoints not associated with processing of the tunnel, depicted as endpoint 306n, may respond to the forwarded message with an indication that the received SPI is invalid 436, that is the SPI is not associated with a tunnel processed by the endpoint. When responding to IKE messages, the endpoints may respond within the SA; however, as described further below, when responding to AH or ESP messages, the endpoints send the informational message indicating an invalid SPI outside of the SA. When the load balancer 302 receives the informational message that the SPI is invalid, the mapping table may be updated by removing the endpoint from the list of endpoints for forwarding messages with the corresponding IP:SPI to. As depicted in FIG. 4, the mapping table was already updated based on the child SA response and as such, does not require further updating.

FIG. 5 depicts the process flow for AH/ESP messages. The initiator 304a may send AH and/or ESP packets within an SA. The AH/ESP message 502 includes a respective SPI. Although the packets may be encrypted, the SPI portions of the packets are not encrypted and as such, the SPI within the packet may be accessed by the load balancer. As depicted in FIG. 5, the AH/ESP message 502 includes an SPI of 's3'. When received at the load balancer, the source IP of the message and the contained SPI is checked against the mapping table 312 to determine an endpoint for sending the message to. When the IP:SPI pair are not found in the mapping table, that is they are unrecognized by the load balancer 302, the mapping is updated 506 to associate all of the endpoints with the IP:SPI pair. When the IP:SPI is not recognized, by the load balancer, the message is forwarded to all endpoints 508, 510. In FIG. 5, it is endpoint 306a that is responsible for the tunnel the message 502 is associated with. The endpoint 306a receives the forwarded message 510 and processes the message, responding with an AH/ESP response 512. The AH/ESP response message is received at the load balancer 302 and is forwarded to the initiator 514. The load balancer 302 is unable to determine the contents of the AH/ESP message and as such is unable to use the response in updating the mapping table. Further, the load balancer 302 is unable to utilize the SPI value in the message for determining which endpoint processes the packets, since the SPI values are local, that is there is one SPI value at the originator and one value at the terminator, and only one value appears in the AH/ESP message so it is not possible to correlate the SPI in one direction with the SPI in the reverse direction. When the AH/ESP message 508 is received at the endpoint 306n, the SPI is not recognized and as such the endpoint sends an informational message indicating that the SPI is invalid 516. The endpoint 306n transmits the informational message outside of the SA. When the message 516 is received 518 at the load balancer 302, it is used to update the mapping table 520 in order to remove the endpoint 306n that sent the informational message from the mapping table associated with the IP:SPI. When subsequent packets from a source IP that include an SPI found in the mapping table are received, the load balancer 302 forwards the packet to the terminator, or endpoints, identified in the mapping table. As such, packets associated with a particular tunnel will be forwarded to the correct terminator, even if multiple tunnels are established to different endpoints from the same IP address.

FIG. 6 depicts the process of receiving a new tunnel request at the load balancer from the same initiator. The process is similar to that described above with regard to FIG. 4. The initiator 304a may attempt to establish a new IPsec tunnel and sends an IKE Phase 1 request with a corresponding new SPI, namely 's10', 602 to the load balancer 302. The load balancer 302 receives the request message for establishing a new tunnel, which is not yet associated with an IPsec terminator, and selects one of the IPsec endpoints, depicted as endpoint 306n, for establishing the tunnel with. Once the load balancer 302 selects the endpoint 306n for the VPN, the source IP and SPI of the request message is associated with the selected endpoint in the mapping table 606. The load balancer 302 forwards the IKE phase 1 response to the selected endpoint 608, which responds accordingly 610 to the load balancer 302. The load balancer 302 forwards the response message 612 to the initiator to establish the initial SA 614.

As described above, it is possible to load balance IPsec tunnels received from the same source IP address by tracking the IP and SPI of messages and the endpoint used for the message. As messages beyond the original IKE phase 1 message used for the load balancing decision are received that are associated with unrecognized IP and SPI pairs, the message is forwarded to all endpoints and the messages received in response are used to update the mapping table specifying the endpoint to use for subsequent messages with an IP:SPI pair. The response messages from an endpoint indicating that the SPI of a forwarded message is not recognized or is invalid may be transmitted outside of an SA for responses to AH and/or ESP messages. The messages received may provide a positive indication that the endpoint is the correct endpoint for processing the IP:SPI pair. For example, a child SA response received from an endpoint positively identifies the endpoint as the correct location for processing the IP:SPI pairs. However, other messages may be not positively identify the endpoint for processing messages. Rather, informational response messages may indicate that the endpoint is not the correct endpoint for processing the IP:SPI pair messages. Such informational messages may be used by the load balancer 302 in a process of elimination to remove the endpoints that have indicated that the forwarded SPI is invalid.

Figure 7:
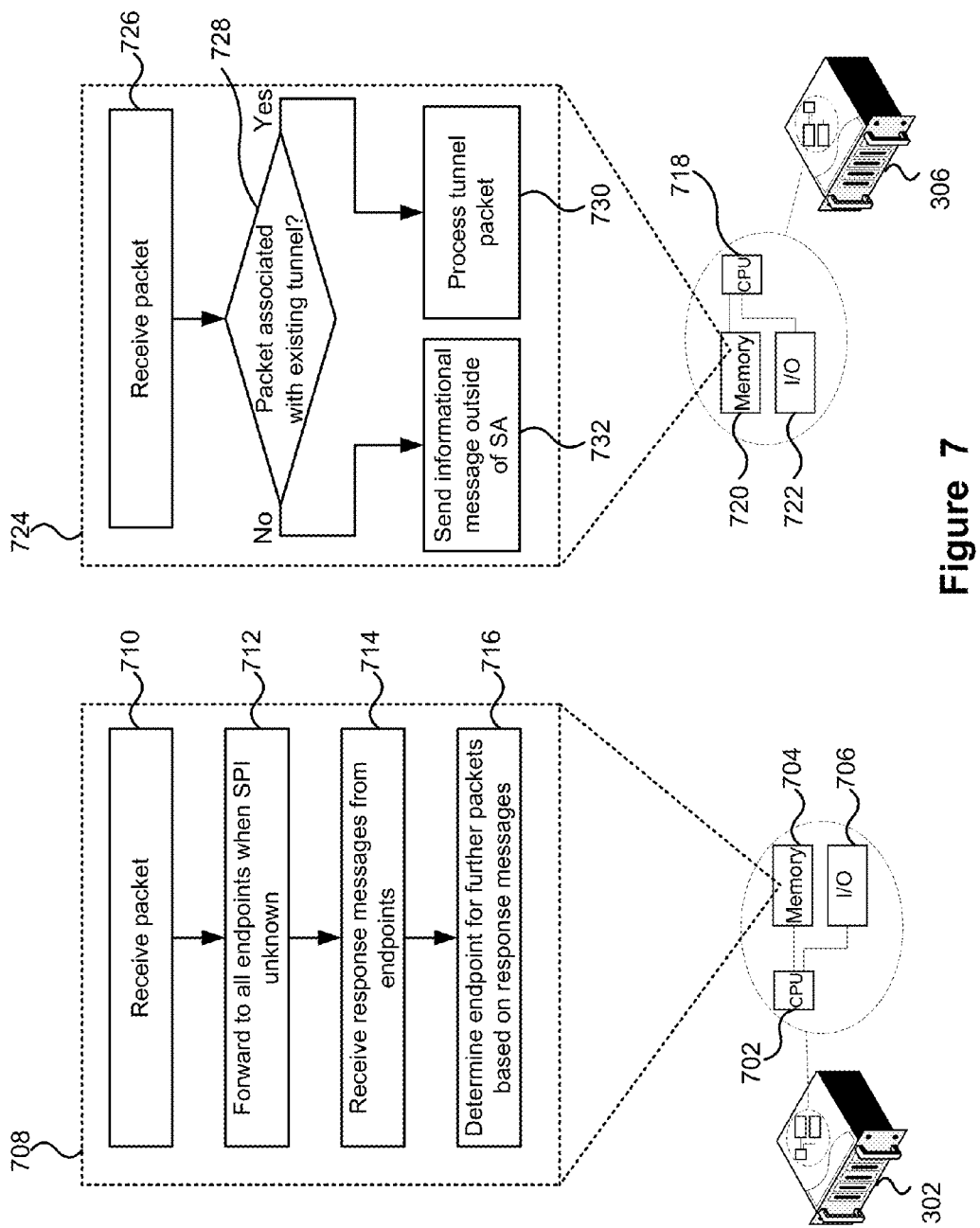
FIG. 7 depicts components of a load balancer.

FIG. 7 depicts components of a load balancer and components of a co-operating endpoint such as a VPN gateway. The load balancer 302 may include a processing unit 702 for executing instructions. The processing unit 702 may be provided by one or more physical central processing units (CPUs) each with one or more processing cores. The load balancer 302 may include memory unit 704 for storing data and instructions for execution by the processing unit 702. The memory unit may include both volatile and non-volatile storage components. The memory unit 704 may include, for example registers and memory associated with the processing unit, random access memory (RAM), flash memory, and solid state drives (SSDs) as well as hard disk drives (HDDs). The load balancer 302 may also include one or more input/output (I/O) components 706. The I/O components may comprise I/O busses and or components connected to the processing unit. The connected I/O devices may include, for example network interfaces for communicating over a network, monitors, speakers, keyboards, mice, microphones etc. The memory unit 704 includes data and instructions for providing a load balancer capable of load balancing multiple IPsec tunnels from the same initiator.

The load balancing functionality 708 when executed by the processing unit 702 configures the server to receive IPsec packets from initiator devices (710). Each of the IPsec packets received at the load balancer includes a particular SPI and is received from an initiator associated with a source IP address. The load balancer maintains a mapping table between source IPs:SPIs and IPsec endpoints associated with processing packets with matching IP:SPI pairs. When the load balancer receives a packet having an unrecognized IP:SPI pair that is not found in the mapping table beyond the original IKE phase 1 message that is used to perform the load balancing decision, the received packet is forwarded to all IPsec endpoints (712) that are associated with the load balancer. Once the IPsec packet is forwarded to all the endpoints, one or more response messages may be received (714) from the endpoints. The received messages may indicate that the endpoint sending the message does not process a tunnel associated with the SPI, or may be a response message indicating a child SA established with the endpoint. Based on the one or more received messages, the load balancer determines (716) an IPsec terminator, or endpoints, that further packets received at the load balancer having the same source IP:SPI as the forwarded packet will be processed by. The load balancer updates a mapping table accordingly, so that when new packets are received with the IP:SPI pair, they will be sent to the corresponding terminator, without requiring them to first be forwarded to all endpoints.

The endpoint apparatus 306 may be one of a plurality of endpoint apparatuses associated with the load balancer 302 and may include a processing unit 718 for executing instructions. The processing unit 718 may be provided by one or more physical central processing units (CPUs) each with one or more processing cores. The endpoint apparatus 306 may include memory unit 720 for storing data and instructions for execution by the processing unit 718. The memory unit 720 may include both volatile and non-volatile storage components. The memory unit 720 may include, for example registers and memory associated with the processing unit, random access memory (RAM), flash memory, and solid state drives (SSDs) as well as hard disk drives (HDDs). The endpoint apparatus 306 may also include one or more input/output (I/O) components 722. The I/O components may comprise I/O busses and or components connected to the processing unit. The connected I/O devices may include, for example network interfaces for communicating over a network, monitors, speakers, keyboards, mice, microphones etc. The memory unit 720 includes data and instructions for providing an endpoint apparatus for use in load balancing IPsec tunnels.

The endpoint functionality 724 provided by the execution of the instructions includes receiving a packet (726). The packet is received from the load balancer and includes an SPI value that can be used in determining if the packet is associated with an IPsec tunnel terminated by the endpoint apparatus 306 (728). If the packet is associated with an IPsec tunnel endpoint by the endpoint apparatus 306 (Yes at 728) the endpoint apparatus processes the IPsec packet normally (730). If the packet is not associated with an IPsec tunnel terminated by the endpoint apparatus 306 (No at 728) the endpoint apparatus 306 sends an informational message back to the load balancer 302 indicating that the received packet is not associated with a tunnel terminated by the endpoint apparatus (732). The informational message may be sent outside of an established SA in order to allow the load balancer to receive the information and remove the endpoint apparatus from a list of endpoints that packets with the same SPI are forwarded to.

Figure 8:
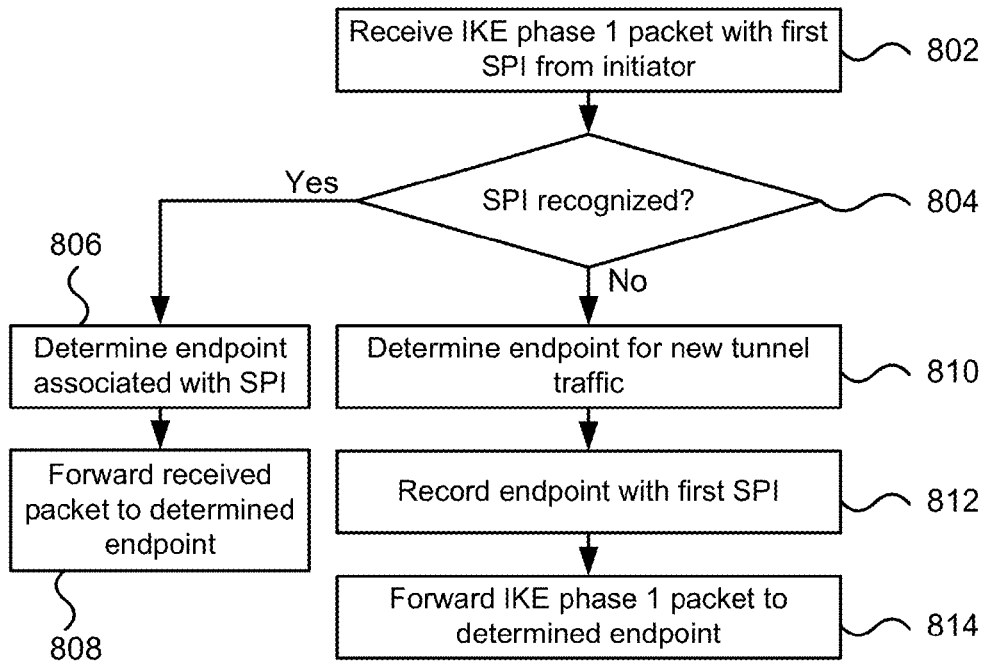
FIG. 8 depicts a method for load balancing IPsec traffic.

FIG. 8 depicts a method for load balancing IPsec traffic. The method 800 depicts the processing associated with IKE phase 1 packets. The method 800 receives an IKE phase 1 packet having a first SPI from an initiator (802). The method determines if the SPI of the received packet is recognized (804), and if the SPI is recognized (Yes at 804), that is another packet with the same SPI has been received and sent to a particular terminator, the associated endpoint is determined (806). Once the associated endpoint is determined, the received packet is forwarded to the determined endpoint (808) and processed accordingly. If the SPI is not recognized (No at 804) for example if the received packet is a first IKE phase 1 packet and an IPsec endpoint has not yet been assigned for processing the tunnel, an endpoint for processing the packet and associated tunnel is determined (810). The load balancer may determine an endpoint in various manners, such as in a round robin manner or based on current processing loads of the individual endpoints. Once the endpoint is determined, it is recorded in association with the source IP and SPI from the initial message (812), for example in a mapping table or similar structure. The received IKE phase 1 packet is forwarded to the determined endpoint (814), and a security association (SA) is established between the initiator and the determined endpoint (816). Once the endpoint is selected, and the association recorded, subsequently received packets having the same IP:SPI pair will be forwarded to the same endpoint for processing.

Figure 9:
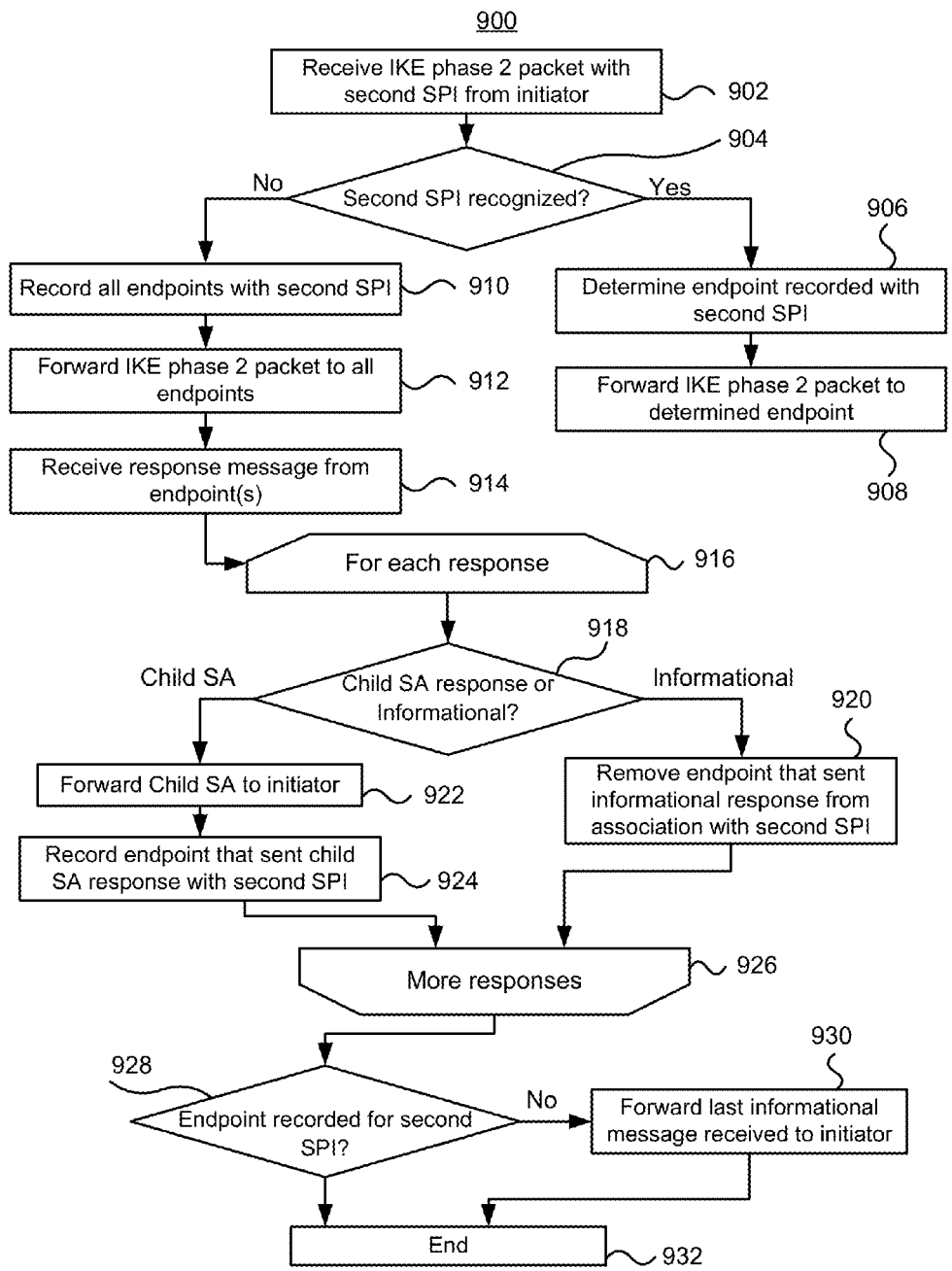
FIG. 9 depicts a further method for load balancing IPsec traffic.

FIG. 9 depicts a further method for load balancing IPsec traffic. The method 900 depicts the processing associated with IKE phase 2 packets. An IKE phase 2 packet may be received from the same initiator but may have a different SPI (902). Upon receiving a packet, it is determined if the IP:SPI pair is already recorded in association with the determined endpoint (904). In FIG. 9, it is assumed that the received IKE phase 2 packet is associated with the IKE phase 1 packets previously received as described above with regard to FIG. 8 and as such should be processed by the same terminator; however, the second SPI is not associated with the endpoint and as such the load balancer does not know where to forward the received message. If the SPI of the received packet is recognized (Yes at 904), the endpoint associated with the IP:SPI is determined (906) and the packet forwarded to the endpoint (908). If however, the IP:SPI is not recognized (No at 904) the IP:SPI is recorded in association with all IPsec endpoints (910) and the packet forwarded to all of the endpoints (912). The responses from the endpoints are received (914) and each of the received responses (916) is processed until all responses are processed (926). For each received response, it is determined if the response is a Child SA message, or an informational message (918). If the message is an informational message (Informational at 918) that indicates that the SPI is invalid, the endpoint that sent the informational message is removed from the association with the IP:SPI (920) so that any subsequently received packets having the same IP:SPI will not be forwarded to the endpoint. If the message is a child SA message (Child SA at 918), child SA response is forwarded to the initiator (922) and the endpoint that sent the child SA message is recorded in association with the IP:SPI so that the endpoint is the only one associated with the IP:SPI (924). Once there are no more received responses (926) to be processed, it is determined if there is at least one endpoint recorded in association with the IP:SPI (928). If there is not an endpoint still registered in association with the IP:SPI (No at 928), then none of the endpoints recognize the SPI and the last received informational message is forwarded to the initiator (930) as an error message. After forwarding the last informational message, or if there is an endpoint still recorded in association with the IP:SPI (Yes at 928), the processing is complete (932).

Figure 10:
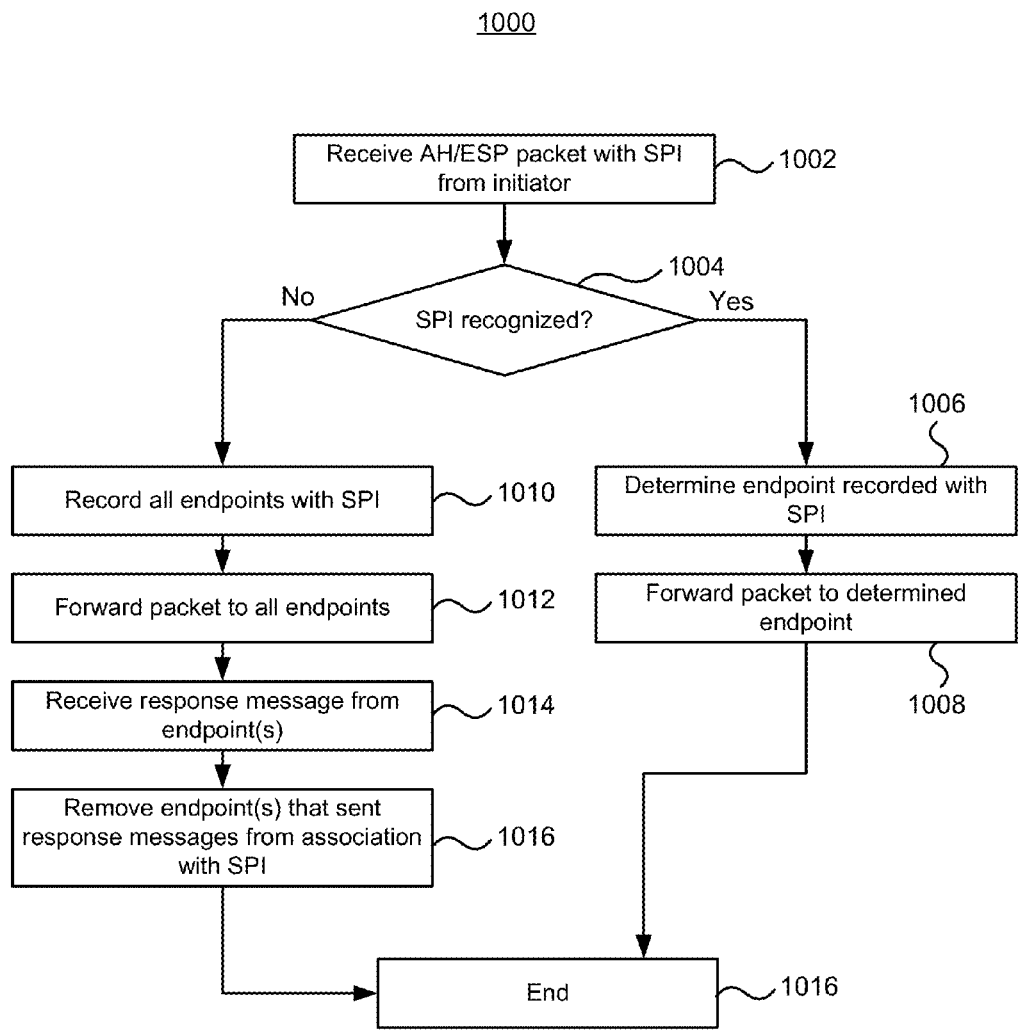
FIG. 10 depicts a further method for load balancing IPsec traffic.

FIG. 10 depicts a further method for load balancing IPsec traffic. The method 1000 depicts the processing associated with AH and/or ESP packets. An AH/ESP packet with an SPI (1002) from an initiator is received. It is determined whether or not the SPI of the received packet is recognized (1004). An SPI is recognized when the IP:SPI pair is associated with a particular endpoint. The association may be recorded in various ways, including for example using a mapping table or similar structure. If the SPI is recognized (Yes at 1004) the endpoint associated with the IP:SPI is determined (1006) and the packet forwarded to the determined endpoint (1008) and the processing of the AH/ESP packets finishes (1018). If however, the SPI is not recognized (No at 1004), all endpoints are registered in association with the IP:SPI (1010) and the received packet is forwarded to each of the endpoints (1012). Any of the endpoints that receive the AH/ESP packet but do not have an SA indicated by the SPI respond to the packet with an informational message sent outside of an SA indicating that the SPI is invalid. The endpoint that is responsible for the SA indicated by the SPI will respond with an AH/ESP response, which the load balancer will not be able to identify as a result of the tunnel encryption the AH/ESP response messages are forwarded to the appropriate initiator. Accordingly, in order to determine the endpoint to forward packets to with the IP:SPI, the method uses a process of elimination from the recorded association when an informational message is received indicating that the SPI is invalid. When the informational message indicating an invalid SPI is received from endpoints (1014), the corresponding endpoint is removed from the association with the IP:SPI (1016) and the processing of the AH/ESP packets finishes (1018).

The above has described various aspects of load balancing IPsec traffic. As described, even if multiple IPsec tunnels are established from a single initiator, the tunnels may be balanced across multiple separate IPsec endpoints. Although the above has described the load balancing with reference to various specific details, it will be appreciated that specific details may be varied while still providing the load balancing of IPsec traffic. As an example, the above has described storing associations between IPsec endpoints, source IPs and SPIs in a mapping table; however, other storage structures may be used for recording the association. Further, the specific order of steps described with reference to the methods may be altered. For example, although described as recording associations and then forwarding packets to endpoints, it is possible to forward the packets and then record the association, or it may be done in parallel. Although various components, such as IPsec initiators, load balancers and IPsec endpoints, may be described as separate physical components, it is contemplated that one or more of the components may be provided on the same physical computing hardware. As an example, multiple initiators may be provided on a single computing device. Further, for example, load balancers may be provided on the same physical computing device as one or more of the IPsec endpoints.

Although certain components and step have been described, it is contemplated that individually described components, as well as steps, may be combined together into fewer components or steps or the steps may be performed sequentially, non-sequentially or concurrently. Similarly, individual components or steps may be provided by a plurality of components or steps. One of ordinary skill in the art having regard to the current teachings will appreciate that the IPsec load balancing functionality may be provided by various combinations of software, firmware and/or hardware, other than the specific implementations described herein as illustrative examples.

What is claimed is:
1. A method for load balancing comprising:
receiving an Internet Protocol Security (IPsec) packet at a load balancer from an IPsec initiator, the received packet comprising an IP address of the IPsec initiator and a security parameter identifier (SPI);
forwarding the received packet to each of a plurality of IPsec endpoints when the IP address of the IPsec initiator and the SPI of the received packet is unrecognized by the load balancer;

receiving a response message at the load balancer from one of the plurality of IPsec endpoints in response to the forwarded packet; and determining, at the load balancer, an IPsec endpoint associated with the IP address and the SPI of the received packet based on the received response message.

2. The method of claim 1, wherein the IPsec endpoints associated with the IP address and the SPI indicate which IPsec endpoint or endpoints to forward subsequent packets to that are received from the IP address and include the SPI.

3. The method of claim 2, wherein the IPsec endpoints associated with the IP address and the SPI are stored in a mapping table, accessible by the load balancer, for mapping IP:SPI pairs to at least one of the plurality of IPsec endpoints.

4. The method of claim 3, further comprising:
recording in the mapping table an association between all IPsec endpoints, the IP address of the initiator, and the SPI when forwarding the received packet to each of the plurality of IPsec endpoints.

5. The method of claim 1, further comprising:
receiving an initial IPsec internet key exchange (IKE) phase 1 packet at the load balancer;
selecting, by the load balancer, one of the plurality of IPsec endpoints for the packet according to load balancing criteria;
recording, by the load balancer, the selected one of the plurality of IPsec endpoints in association with an IP address of the initial IPsec IKE phase 1 packet and an SPI of the initial IPsec IKE phase 1 packet; and
forwarding the received initial IPsec IKE phase 1 packet to the selected one of the plurality of IPsec endpoints.

6. The method of claim 1, wherein the received IPsec packet is an IKE phase 2 packet, and the response message comprises an IKE Child SA response message and determining the IPsec endpoints associated with the IP address and SPI comprises:
associating the IPsec endpoint that sent the IKE child SA response message with the IP address of the initiator and SPI so that subsequent packets received at the load balancer from the IP address of the initiator including the SPI will be forwarded to the associated IPsec endpoint.

7. The method of claim 1, wherein the received IPsec packet is an authentication header (AH) packet or an encapsulating security payload (ESP) packet, wherein the response message comprises an informational message sent outside of an established security association (SA) indicating that the SPI is invalid, and determining the IPsec endpoints associated with the IP address and SPI comprises:
removing the IPsec endpoint that sent the informational message from a recorded mapping, accessible by the load balancer, of the IP address of the initiator and the SPI to the IPsec endpoint.

8. The method of claim 7, further comprising:
determining if any IPsec endpoints are recorded in the mapping with the IP address of the initiator and the SPI after removing the IPsec endpoint that sent the informational message; and
forwarding the informational message from the load balancer to the IPsec initiator when it is determined there are no IPsec endpoints in the mapping with the IP address of the initiator and the SPI.

9. The method of claim 1, further comprising:
receiving at the load balancer an IPsec internet key exchange (IKE) phase 1 packet from the IPsec initiator;
identifying an IPsec endpoint associated with the IP address and SPI of the IPsec IKE phase 1 packet; and
forwarding the received IPsec IKE phase 1 packet to the identified IPsec endpoint.

10. A load balancer apparatus comprising:
a network interface coupled to a network, the network interface for receiving an Internet Protocol Security (IPsec) packet from an IPsec initiator, the received packet comprising an IP address of the IPsec initiator and a security parameter identifier (SPI);
a processor coupled to the network interface, for executing instructions that configure the load balancer apparatus to:
forward the received packet to each of a plurality of IPsec endpoints connected to the network interface when the IP address of the IPsec initiator and SPI of the received packet is unrecognized by the load balancer;
receive a response message at the load balancer from one of the plurality of IPsec endpoints in response to the forwarded packet; and
determine at the load balancer an IPsec endpoints associated with the IP address and the SPI of the received packet based on the received response message.

11. The load balancer apparatus of claim 10, wherein the IPsec endpoints associated with the IP address and the SPI indicate which IPsec endpoints to forward subsequent packets to that are received from the IP address and include the SPI.

12. The load balancer apparatus of claim 11, wherein the IPsec endpoints associated with the IP address and the SPI are stored in a mapping table, accessible by the load balancer, for mapping IP:SPI pairs to at least one of the plurality of IPsec endpoints.

13. The load balancer apparatus of claim 12, wherein the executed instructions by the processor further configure the load balancer apparatus to:
record in the mapping table an association between all IPsec endpoints, the IP address of the initiator, and the SPI when forwarding the received packet to each of the plurality of IPsec endpoints.

14. The load balancer apparatus of claim 10, wherein the network interface is further configured for receiving an initial IPsec internet key exchange (IKE) phase 1 packet, and wherein the executed instructions by the processor further configure the load balancer apparatus to:
select, by the load balancer, one of the plurality of IPsec endpoints for the packet according to load balancing criteria;
record, by the load balancer, the selected one of the plurality of IPsec endpoints in association with an IP address of the initial IPsec IKE phase 1 packet and an SPI of the initial IPsec IKE phase 1 packet; and
forward the received initial IPsec IKE phase 1 packet to the selected one of the plurality of IPsec endpoints.

15. The load balancer apparatus of claim 10, wherein the received IPsec packet is an IKE phase 2 packet, wherein the response message comprises an IKE Child SA response message and wherein determining the IPsec endpoints associated with the IP address and SPI comprises:
associating the IPsec endpoint that sent the IKE child SA response message with the IP address of the initiator and SPI so that subsequent packets received at the load balancer from the IP address of the initiator including the SPI will be forwarded to the associated IPsec endpoint.

16. The load balancer apparatus of claim 10, wherein the received IPsec packet is an authentication header (AH) packet or an encapsulating security payload (ESP) packet, wherein the response message comprises an informational message sent outside of an established security association (SA) indicating that the SPI is invalid, and determining the IPsec endpoints associated with the IP address and SPI comprises:

removing the IPsec endpoint that sent the informational message from a recorded mapping, accessible by the load balancer, of the IP address of the initiator and the SPI to the IPsec endpoint.

17. The load balancer apparatus of claim 16, wherein the executed instructions by the processor further configure the load balancer apparatus to:

determine if any IPsec endpoints are recorded in the mapping with the IP address of the initiator and the SPI after removing the IPsec endpoint that sent the informational message; and forward the informational message from the load balancer to the IPsec initiator when it is determined there are no IPsec endpoints recorded in the mapping with the IP address of the initiator and the SPI.

18. The load balancer apparatus of claim 10, wherein the network interface is further configured for receiving an IPsec internet key exchange (IKE) phase 1 packet from the IPsec initiator, and wherein the executed instructions by the processor further configure the load balancer apparatus to:

identify an IPsec endpoint associated with the IP address and SPI of the IPsec IKE phase 1 packet; and forwarding the received IPsec IKE phase 1 packet to the identified IPsec endpoint.

19. A virtual private network (VPN) endpoint apparatus comprising:

a network interface coupled to a network, the network interface for receiving a Internet Protocol Security (IPsec) packet from an IPsec load balancer, the received packet comprising an IP address of the IPsec initiator and a security parameter identifier (SPI); and a processor coupled to the network interface, for executing instructions that configure the endpoint apparatus to:

determine if the SPI of the received IPsec packet is associated with an IPsec tunnel terminated by the endpoint apparatus; and send an informational message to the IPsec load balancer indicating that the received IPsec packet is not terminated by the endpoint apparatus.

20. The VPN endpoint apparatus of claim 19, wherein the informational message indicates that the SPI is invalid.

21. The VPN endpoint apparatus of claim 19, wherein the informational message is sent outside of an established security association (SA) to the IPsec load balancer indicating that the received IPsec packet is not terminated by the endpoint apparatus.

22. The VPN endpoint apparatus of claim 19, wherein the received IPsec packet is an authentication header (AH) packet or an encapsulating security payload (ESP) packet or Internet key exchange (IKE) packet.

23. A method for use in load balancing comprising:

receiving at an Internet Protocol Security (IPsec) endpoint apparatus an IPsec packet from an IPsec load balancer, the received packet comprising an IP address of the IPsec initiator and a security parameter identifier (SPI);

determining if the SPI of the received IPsec packet is associated with an IPsec tunnel terminated by the endpoint apparatus; and sending an informational message to the IPsec load balancer indicating that the received IPsec packet is not terminated by the endpoint apparatus.

24. The method of claim 23, wherein the informational message indicates that the SPI is invalid.

25. The method of claim 23, wherein the informational message is sent outside of an established security association (SA) to the IPsec load balancer indicating that the received IPsec packet is not terminated by the endpoint apparatus.

26. The method of claim 23, wherein the received IPsec packet is an authentication header (AH) packet or an encapsulating security payload (ESP) packet or Internet key exchange (IKE) packet.

* * * * *